United States Patent [19]

Karlsson

[11] 4,399,716
[45] Aug. 23, 1983

[54] TORQUE TRANSMITTING DEVICE

[76] Inventor: Birger K. L. Karlsson, Lyckebo, Box 1062, S-360 14 Väckelsång, Sweden

[21] Appl. No.: 228,510

[22] Filed: Jan. 26, 1981

[30] Foreign Application Priority Data

Feb. 12, 1980 [SE] Sweden ............................. 8001076

[51] Int. Cl.³ ............................................. F16D 27/10
[52] U.S. Cl. .................................................. 74/125.5
[58] Field of Search ...................... 74/125.5, 113, 112, 74/63; 81/60

[56] References Cited

U.S. PATENT DOCUMENTS 1,873,633  8/1932  Pitter .................................. 74/125.5
3,722,305  3/1973  Walters et al. ...................... 74/125.5

Primary Examiner—Peter P. Nerbun
Attorney, Agent, or Firm—Sughrue, Mion, Zinn, Macpeak and Seas

[57] ABSTRACT

A device for transmitting torque between a shaft (1) and an outer annular element (2), in which device the transmission ratio between the shaft and the annular element is determined by the load on the ring. The device comprises at least one eccentric device (5) arranged for rotation with the shaft, and at least one rocker arm (7) which can be activated by the eccentric device and which is provided with an engaging means (11). The engaging means are arranged to be brought into driving contact with the annular ring (2) encircling the shaft (1), by movement of the said at least one rocker arm. The eccentric device (5) is so designed that its effective length varies in dependence on the load required to activate the rocker arm (7). The device can be used to advantage in winches, for example sheet winches on sailing boats.

5 Claims, 3 Drawing Figures

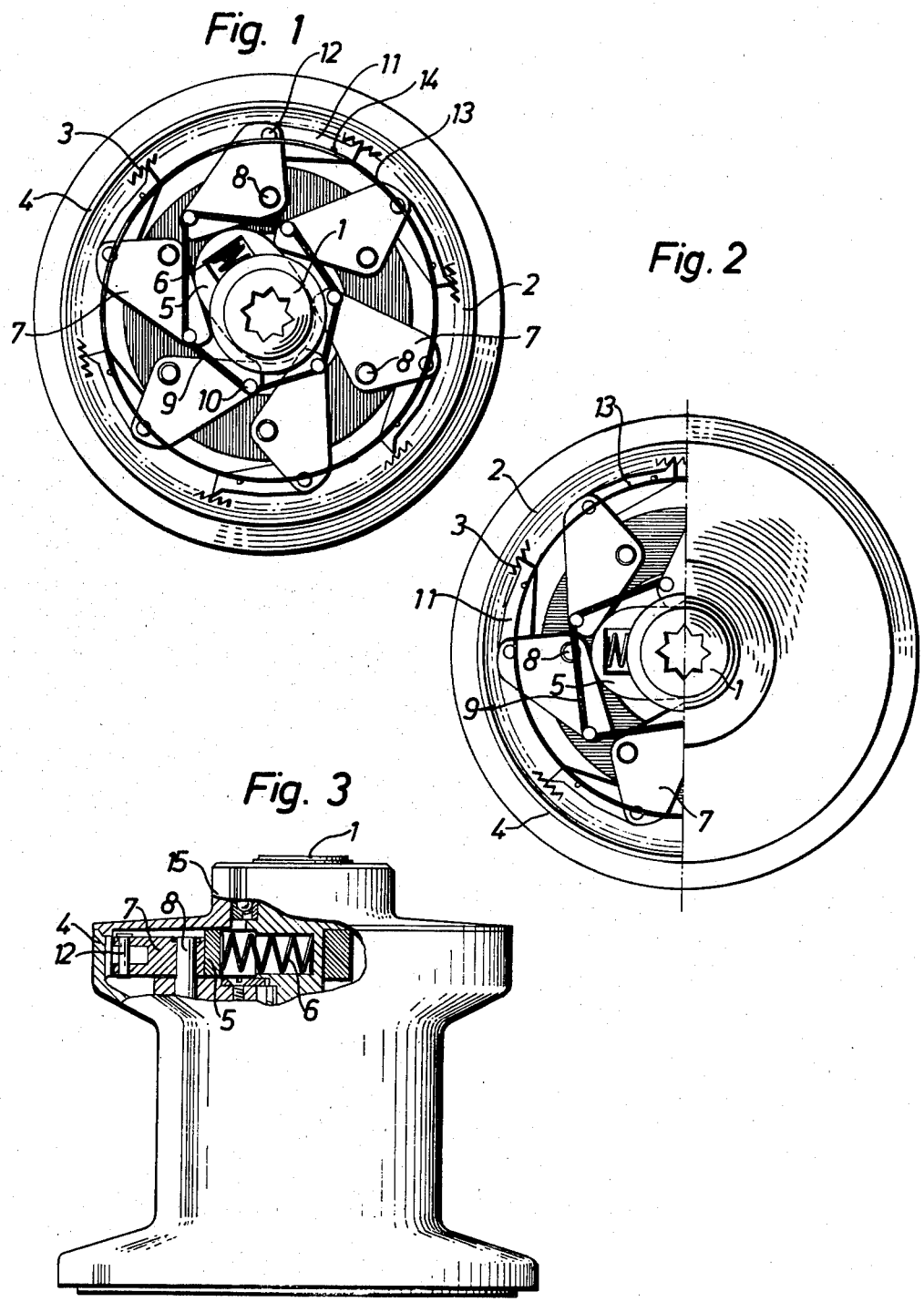

TORQUE TRANSMITTING DEVICE

The present invention relates to a device for transmitting torque between a shaft and an outer annular element, particularly for use in winches and like devices on, for example, sailing boats.

In the case of, for example, sheet winches on sailing boats it is desirable to be able to use different transmission ratios between the operating crank and the drum, so that when the load on the sheet is low the sheet can be wound in quickly, while when the load is high sufficient force can be exerted to stretch the sheet to the extent required with a moderate manual power. Two-gear and three-gear sheet winches are known to the art. One disadvantage with these known winches, however, is that a manual contribution is required when changing from one transmission ratio to another. Another disadvantage resides in the marked differences between these ratios.

The main object of the invention is to provide a simple and reliable device for transmitting torque between a shaft and an outer annular element, with which there is obtained a substantially smooth and continuous variation in the transmission ratio between the shaft and the ring, said variations being dependent on the load on the ring.

To this end the device according to the invention includes at least one eccentric device which rotates with the shaft and at least one rocker arm which is activated by the eccentric device and which is provided with an engaging means arranged to be brought into driving engagement with the surrounding ring by movement of the rocker arm; and the active length of the eccentric device varies in dependence on the force required to activate the rocker arm.

In order to ensure that the outer ring rotates as smoothly as possible, there is preferably used a plurality of rocker arms arranged in uniform spaced relationship around the input shaft.

The eccentric device suitably has the form of a cam element which is movable in a direction at right angles to the input shaft and which is biassed towards its outer terminal position by means of a spring. Conveniently, the inner surface of the ring is provided with teeth arranged to co-act with dogging elements serving as engaging means, said dogging elements being pivotally mounted on the rocker arms. Those parts of the rocker arms intended to co-act with the eccentric device are urged towards the input shaft by means of a spring, and said dogging elements are suitably urged against the teeth on the inner surface of said ring by means of a spring. The rocker arms may have the form of angled levers pivotally mounted at the point of transition between the two legs thereof, whereat the outer end of one of said legs is arranged to co-act with the eccentric device, while the dogging element of the rocker arm is pivotally mounted on the outer end of the other of said legs.

A preferred embodiment of the invention will now be described with reference to the accompanying drawing, in which FIG. 1 is a top plan view of the torque transmission device according to the invention, with a top cover removed;

FIG. 2 is a view similar to that of FIG. 1, but subsequent to rotating the input shaft through a certain angle; and FIG. 3 is a side view, partly in section, of the transmission device shown in FIGS. 1 and 2.

The device illustrated in the drawing is intended for transmitting torque from an input shaft 1, which can be turned by a crank or like element, and an outer ring 2 whose inner surface is provided with teeth only short sections 3 of which have been shown. The ring 2 may be attached to or form part of a winch drum 4. An eccentric device 5, operative as a cam element, is non-rotatably connected to the input shaft 1 in a manner to permit said device 5 to be moved axially at right angles to the input shaft. The eccentric device is biased towards an outer terminal position, by means of a spring 6.

Arranged between the input shaft 1 and the ring 2 encircling said shaft is a multiplicity of rocker arms 7 which can pivot on fixed pivots 8. The rocker arms 7 have the form of angled lever arms, said pivots 8 being located at the point of transition between the two legs of the lever arms, as illustrated. The outer end of one leg of each rocker arm 7 is urged towards the input shaft by a spring means 9, e.g. by a ring of neoprene rubber or like elastic material. The ring is fitted over pegs 10 located at the ends of said legs. Pivotally mounted on the outer end of the other leg of each rocker arm 7 by means of a pivot 12 is a dogging element 11. The dogging elements 11 are urged against the toothed ring by means of a wire-spring element 13 arranged to coact with pins 14 mounted on said dogging elements.

As shown in FIG. 3, a torque transmission device according to the invention can, to advantage, be fitted to the upper end of a winch arrangement, e.g. a sheet winch, provided with a tightly fitting end closure 15. This end closure, together with an appropriate sealing means, enables the housing which accomodates all moving parts to be filled with oil, thereby to ensure reliability in operation and to prevent corrosion when the winch is used in an aggressive environment.

The device according to the invention has the following mode of operation. If it is assumed, starting from the relative position of rotation shown in FIG. 1 between the input shaft 1, with accompanying eccentric device 5, and the fixed rocker arms 7, that the input shaft 1 is rotated somewhat in an anticlockwise direction, it will be seen that the rocker arm 7 located to the left of the eccentric device 5 in FIG. 1 will be swung on its pivot 8 as a result of the co-action between said eccentric device 5 and one leg of the rocker arm, see FIG. 2. This pointing or swinging movement will cause the associated dogging element 11, which is held by the spring ring 13 in engagement with teeth 3 on the outer ring 2, to turn the ring 2 clockwise through a certain angle. The angle through which the ring 2 is turned depends upon the extent to which the rocker arm 7 is swung, which in turn depends upon how far the eccentric device 5 extends from the input shaft 1. Since the eccentric device 5 is spring-biased towards its outer terminal position its effective length will depend on the force required to swing the rocker arm 7, said force being directly dependent on the load acting on the ring 2.

Since the transmission ratio of the transmission device between the input shaft 1 and the outer ring 2 is thus dependent on the effective length of the eccentric device 5, said transmission ratio will change in response to the load on the ring 2. Thus, the described device will operate as an automatic transmission which, when using a plurality of rocker arms 7, will operate substantially smoothly and continuously.

In the description it has been assumed that the input shaft is rotated anticlockwise. The shaft, however, can also be rotated clockwise with the same effect as that aforedescribed.

Although the transmission device has been described with reference to sheet winches on sailing boats, it may also be used in other connections, e.g. with slowly operating machines in which an automatic and substantially continuous variation in the transmission ratio is required in dependence on the load on the output shaft. Tests made on a transmission device of the kind illustrated in the drawing have shown that said device provides a transmission ratio which varies, depending on the load, between 1:6 to 1:20 or 1:21. As will be understood, a ratio of 1:1 can also be obtained by mechanically locking, for example, the crank to the drum. The transmission ratio can also be changed by changing the constant or rating of the spring 6. Further, by connecting a conventional two-speed gear between the input shaft and the device according to the invention it is possible to obtain a winch having a transmission ratio varying from 1:1 and up to more than 1:20.

The invention is not restricted to the described preferred embodiment, but can be modified in several respects within the scope of the claims. Thus, rocker arms and the dogging elements can be changed in form and number as desired. The drive between the rocker arms and the encircling ring can also be effected in a manner different to that shown, e.g. purely by frictional contact. Similarly, the rocker arms and dogging elements may be biassed in any suitable manner. The eccentric device may also have a form different to that shown and described and may be biassed with the aid of other kinds of biassing elements. It is also possible to use more than one eccentric device, whereat said eccentric devices are placed in different planes and are mutually offset through different angles. In this case, each eccentric device can be arranged to co-act with an associated array of rocker arms.

What is claimed is:

1. A device for transmitting torque between a shaft and an outer annular element, comprising; at least one eccentric device arranged for rotation with the shaft, said eccentric device including a cam element which is displaceable at right angles to the input shaft and which is biased towards its outermost position by means of a spring; and a plurality of rocker arms in a uniform spaced relationship around the shaft which can be activated by the eccentric device, each of the rocker arms provided with engaging means arranged to be brought into driving engagement with the annular element by movement of said rocker arm, and in which device the effective length of the eccentric device is arranged to vary in dependence upon the force required to activate a rocker arm, thereby to obtain between the shaft and the annular element a transmission ratio which varies in dependence upon the load on the annular element.

2. A device according to claim 1, wherein annular element is provided with inner teeth; and said engaging means includes a dogging element pivotally mounted on a respective rocker arm.

3. A device according to claim 1, wherein that part of said or each rocker arm arranged to co-act with the eccentric device is spring-biased substantially in a direction towards the input shaft.

4. A device according to claim 1, wherein each engaging means is springingly urged against the annular element.

5. A device according to claim 1, wherein each rocker arm has the form of an angled arm which is pivotally mounted at the point of transition between two legs of said angled arm; the outer end of one leg is spring-biassed in a direction towards the input shaft; and associated dogging element is pivotally mounted to the outer end of the other leg.

* * * * *